(12) United States Patent
Feldman

(10) Patent No.: US 6,298,600 B1
(45) Date of Patent: Oct. 9, 2001

(54) SUSPENDED PLANTER TO GROW PLANTS FROM THE BASE

(76) Inventor: Nathan Feldman, 22822 Alturas Dr., Mission Viejo, CA (US) 92691

( * ) Notice: Subject to any disclaimer, the term of this patent is extended or adjusted under 35 U.S.C. 154(b) by 0 days.

(21) Appl. No.: 09/502,833

(22) Filed: Feb. 13, 1999

Related U.S. Application Data

(60) Provisional application No. 60/120,040, filed on Feb. 13, 1999.

(51) Int. Cl.[7] ................................. A01G 9/02; A47G 7/02
(52) U.S. Cl. ........................................... 47/67; 47/79
(58) Field of Search .................................... 47/67, 79, 75, 47/65.6

(56) References Cited

U.S. PATENT DOCUMENTS 3,990,179 * 11/1976 Johnson et al. .......................... 47/67
4,102,081 * 7/1978 Morrow .................................... 47/67
4,446,652 * 5/1984 Anderson ................................. 47/79
4,991,346 * 2/1991 Costa, Jr. et al. ........................ 47/80
6,094,861 * 8/2000 Sandman et al. ......................... 47/67

* cited by examiner

Primary Examiner—Peter M. Poon
Assistant Examiner—Son T. Nguyen

(57) ABSTRACT

A suspended planting container includes a base including an outer periphery and an aperture defining a central vegetation region. An outer wall extends upward from the periphery of the base to a top edge and defines a container region. An inner wall, surrounding the central vegetation region extends upward from the base to a top edge in the interior of the container region. A growing medium retention device is coupled to the top edge of the inner wall to permit vegetation to grow through the perforation into the central vegetation region but prevent growing medium from falling from the container region into the vegetation region.

6 Claims, 5 Drawing Sheets

SUSPENDED PLANTER TO GROW PLANTS FROM THE BASE

RELATED APPLICATIONS

This patent is based on a PROVISIONAL PATENT APPLICATION No. 60/120,040 filed Feb. 13, 1999 which is owned by the same inventor as the present invention. The contents of such provisional application is incorporated herein by reference.

TECHNICAL FIELD

The present invention relates to a hanging pot for growing vegetation and more particularly to a hanging pot for growing vegetation through a recess on the bottom side.

BACKGROUND OF THE INVENTION

Standard hanging containers sold in the garden market are useful but pose several problems. When a fast growing heavy vine passes over the rim, the vine may have a tendency of breaking. Because fibers within vines run lengthwise and vines are strongest when stress is evenly distributed amongst these fibers, a vine hanging directly downward is stronger with less tendency of breaking than a vine bending over the rim of a container.

A standard hanging pot is often highly visible, with the plant growing only over the edge from above. Standard hanging pots when viewed from below appear as a plastic container with leaves radiating from the upper edge, creating an unattractive display. Also this method of having the plant grow only over from the top of a container is an inefficient use of space.

What is needed is a hanging container allowing plants to be grown from the lower portion and for the full surface area of the container to be covered with foliage whereas heavy vines do not pass over a upper rim.

U.S. Pat. No. 005,333,409 is a hanging container with tube projections along uniform intervals around the base allowing plants to be grown from the lower portion of this container. The subject of the stated patent, although possibly a good design for use outdoors, may leak water and growing medium which makes it inappropriate for use indoors. Also the subject of stated patent possesses small tubes that a plant must be placed through making it difficult for the user to insert plants. The tubes must be manufactured separately from the body of the container and then inserted into the container in order to allow it to be manufactured efficiently from an injection mold.

What is further needed is a container allowing plants to be grown from the top and base, having a means for retaining water and extending periods between watering. What is further needed is a container to allow for the easy insertion of plants into the base. What is further needed is a container with a means for retaining the growing medium within the container while allowing a plant to grow out from the base and expand with the plants natural growth.

SUMMARY OF THE INVENTION

An aspect of the present invention is to provide a suspended planting container comprising: a) a base including an outer periphery and an aperture defining a central vegetation region; b) an outer wall extending upward from the periphery of the base to a top edge and defining a container region; c) an inner wall extending upward from the base to a top edge and surrounding the central vegetation region wherein the inner wall extends to a length shorter than a length to which the outer wall extends such that the inner wall extends only partially into the container region; and d) a growing medium retention device including at least one perforation and coupled to the top edge of the inner wall to permit vegetation to grow through the perforation into the central vegetation region but prevent growing medium from falling from the container region into the vegetation region.

The suspended planting container may further including a drainage plate positioned within the container region and separating the container region into a upper growing medium region and a lower reservoir region. The drainage plate may include at least one perforation for permitting water in the upper growing medium region to drain into the lower reservoir region while generally retaining growing medium in the upper growing medium region.

The suspended planting container may further include a wicking mechanism extending from the upper growing medium region to the lower reservoir region for wicking water in the lower reservoir region to the upper growing medium region. The wicking mechanism may include a concave region projecting downward from the drainage plate into the lower reservoir region and includes a port through which water in the lower reservoir region may pass into the concave region and the concave region included growing medium for wicking.

The growing medium retention device may include a pliable first plate with an aperture and a slit extending from the aperture permitting insertion of a plant and securing of the plant around a stem of the plant. Further, a second growing medium retention device, including a pliable plate, with an aperture and a slit extending from the aperture may be included to permit the insertion of a plant such that the slit of the first plate and the slit of the second plate are orientated such that growing medium cannot pass through the slit of the first plate and then the slit of the second plate.

THE PREFERRED EMBODIMENT OF THE INVENTION

Figure 1:
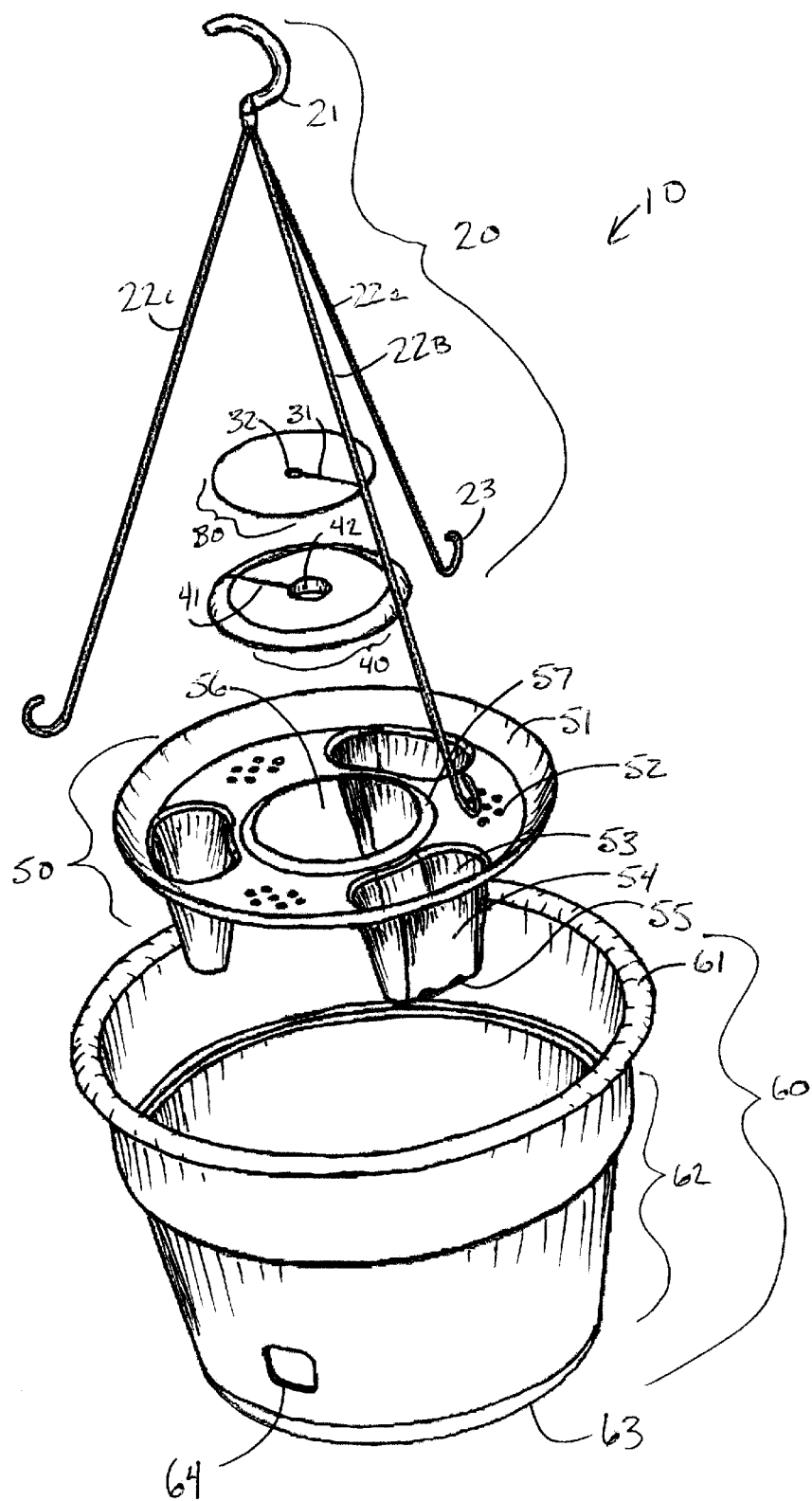
FIG. 1 is a front exploded perspective view of a growing container of one embodiment of the instant invention.
Figure 2:
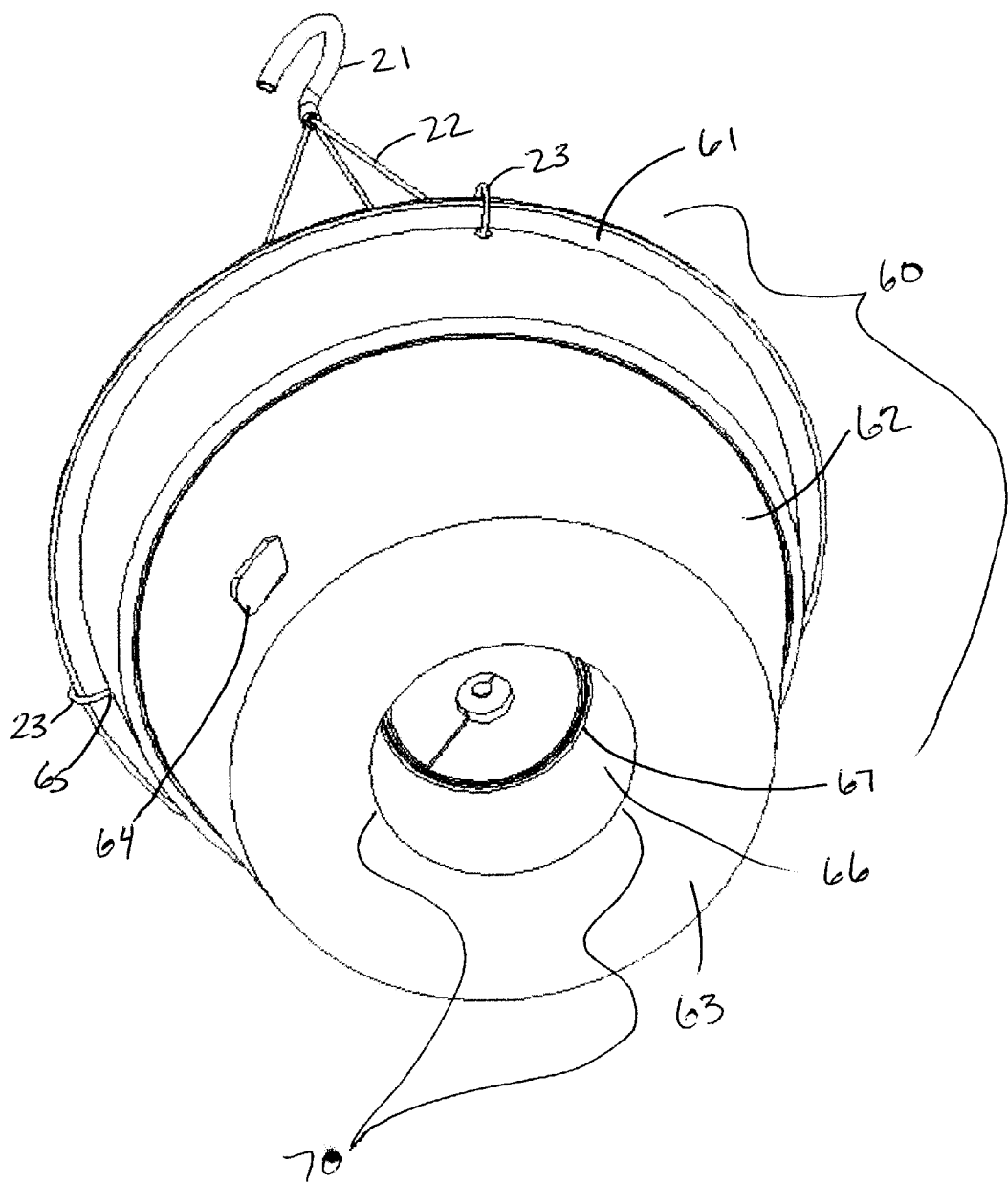
FIG. 2 is a bottom perspective view of the growing container of FIG. 1.

The present invention will now be described in detail with reference to the drawings. In the drawings, like reference numerals are used to refer to like elements throughout.

FIG. 1 shows a suspended planting container 10 of growing medium 76 (FIG. 5) for the hanging culture of plants designed to be produced primarily from an injection mold.

Figure 3:
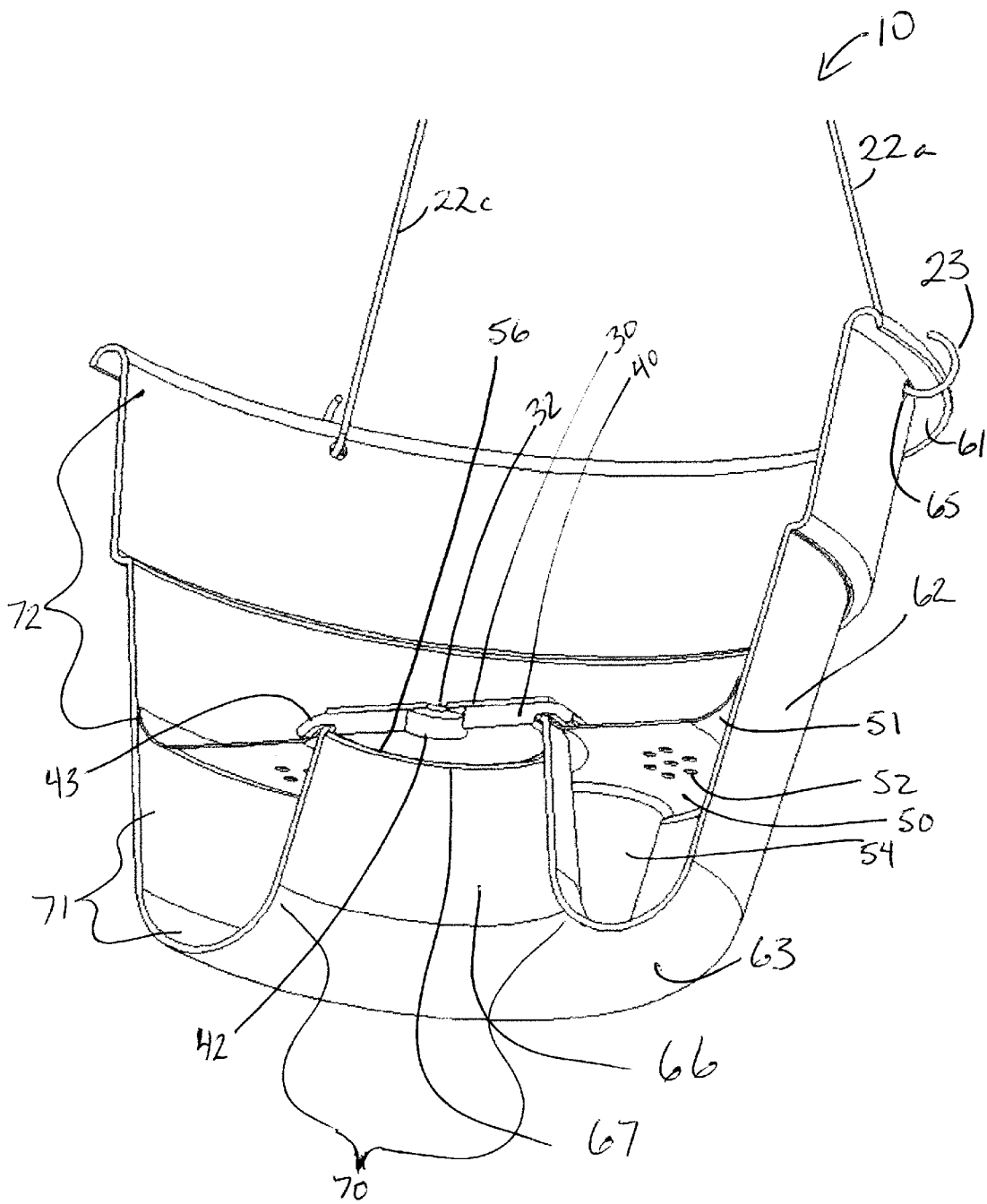
FIG. 3 is a sectional perspective view of the growing container of FIG. 1.

The suspended planting container is preferably a drafted cylinder comprised of an outer wall 62, a base 63, and an inner wall 66 (FIG. 3).

The suspended planting container 10 has a rim 61 or a curved over flange that adds structural integrity to the container 10 at the upper most portion of the outer wall 62.

Hanger apertures 65 near or in the rim 61 allow a hanger 20 to be attached to the container.

The hanger 20 to support the suspended planting container 10 is fastened to the suspended planting container 10 by inserting the lower portion 23 of each wire 22 through a hanger aperture 65 and then bending or looping the lower portion 23 of the wire 22 in such a way that the wire 22 cannot easily slip back through the hanger aperture. Wires 22a. 22b. 22c. are equal in length and unify at a point above the container where they are twisted into a hook 21, or wrapped in a curved aluminum sleeve which may be bent in the form of a hook.

The hanger 20 may hook onto a means to support a hanging pot similar to other hanging pots.

It is further contemplated that the suspended planting container may be suspended by other means than a wire hanger such as a ring stand or other standard method for suspending suspended planting containers.

Referring to FIG. 3, a sloped conical or tubular inner wall 66 extends upward from the base 63 into the suspended planting container 10 to a top edge 67 surrounding a central vegetation region 70. The top edge of the inner wall 66 surrounds an aperture of a size to allow a plant to grow and be inserted through that aperture.

It is further contemplated that the inner wall 66 may be oval, square, or have any other shape rather than being tubular and is intended to be covered within the scope of this patent.

The vegetation region 70 is a channel which a plant may be placed in to allow roots to grow within the suspended planting container 10, and foliage 74 to grow below the base 63 of the suspended planting container 10.

Growing medium retention devices 30, 40, encircle the plants stem 73, support the roots 75, and retain growing medium 76 within the suspended planting container 10.

Referring again to FIG. 3, the upper growing medium retention device 30 is a supple disk to allow for a plants growth, but firm to retain the growing medium. The upper growing medium retention device 30 is a circular disk shape with a perforation 32 in the center, and one slit 31 radiating from that center perforation to the edge. The slit 31 and perforation 32 allow for the upper is growing medium retention device to be placed around the stem 73.

Figure 4:
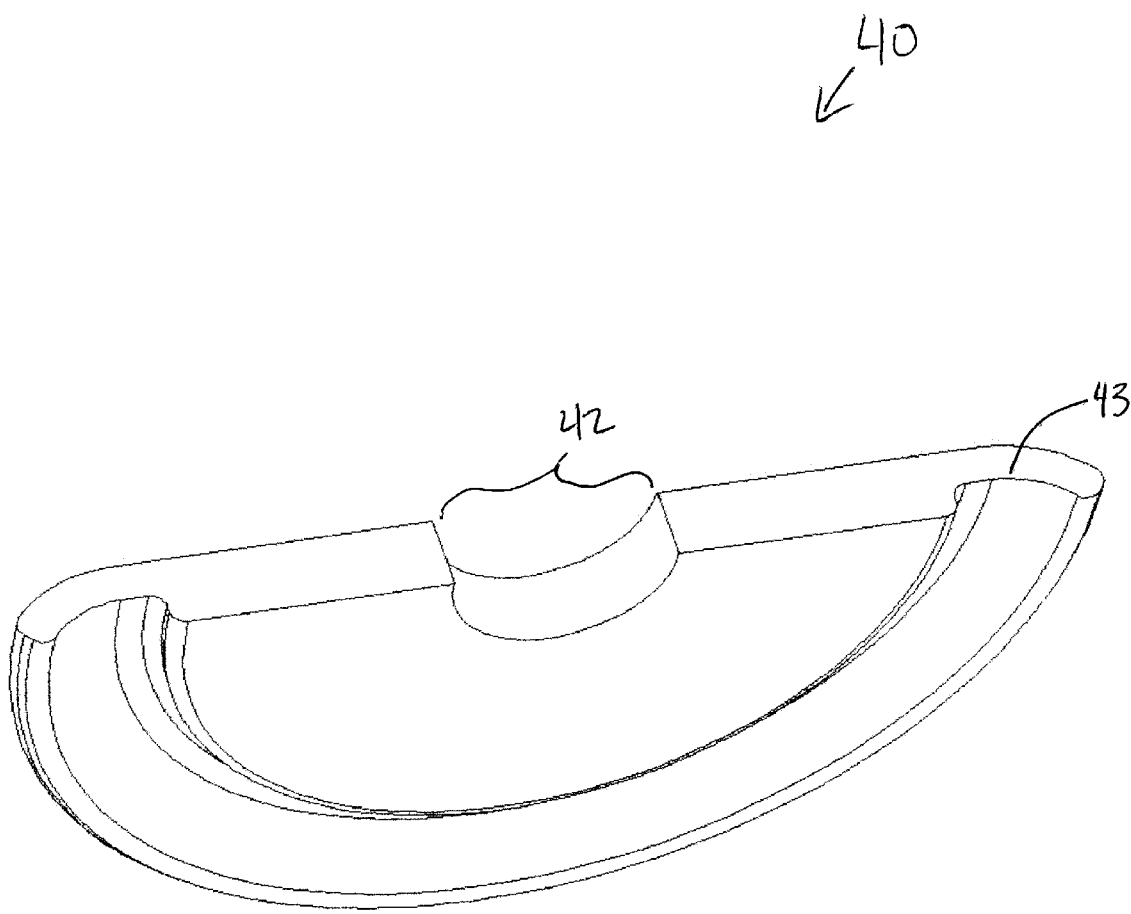
FIG. 4 is a sectional perspective view of a lower growing medium retention device.

The lower growing medium retention device 40 is firmer than the upper growing medium retention device 30. The lower growing medium retention device supports the upper growing medium retention device 30, roots 75 and growing medium 76. The lower growing medium retention device has a larger center perforation 42 when compared to the center perforation 32 in the upper growing medium retention device 30 to prevent a plants stem 73 from being girdled. A slit 41 extends from the center perforation 42 to the edge of the lower growing medium retention device 40 to allow its placement around the stem 73. A lip 43 encircles the outer edge of the lower growing medium retention device to allow the lower growing medium retention device to align and rest upon the top edge 67 of the inner wall 66 and retain a plant suspended into the vegetation region 70. A more detailed cross section of the lower growing medium retention device 40 is shown in FIG. 4.

Figure 5:
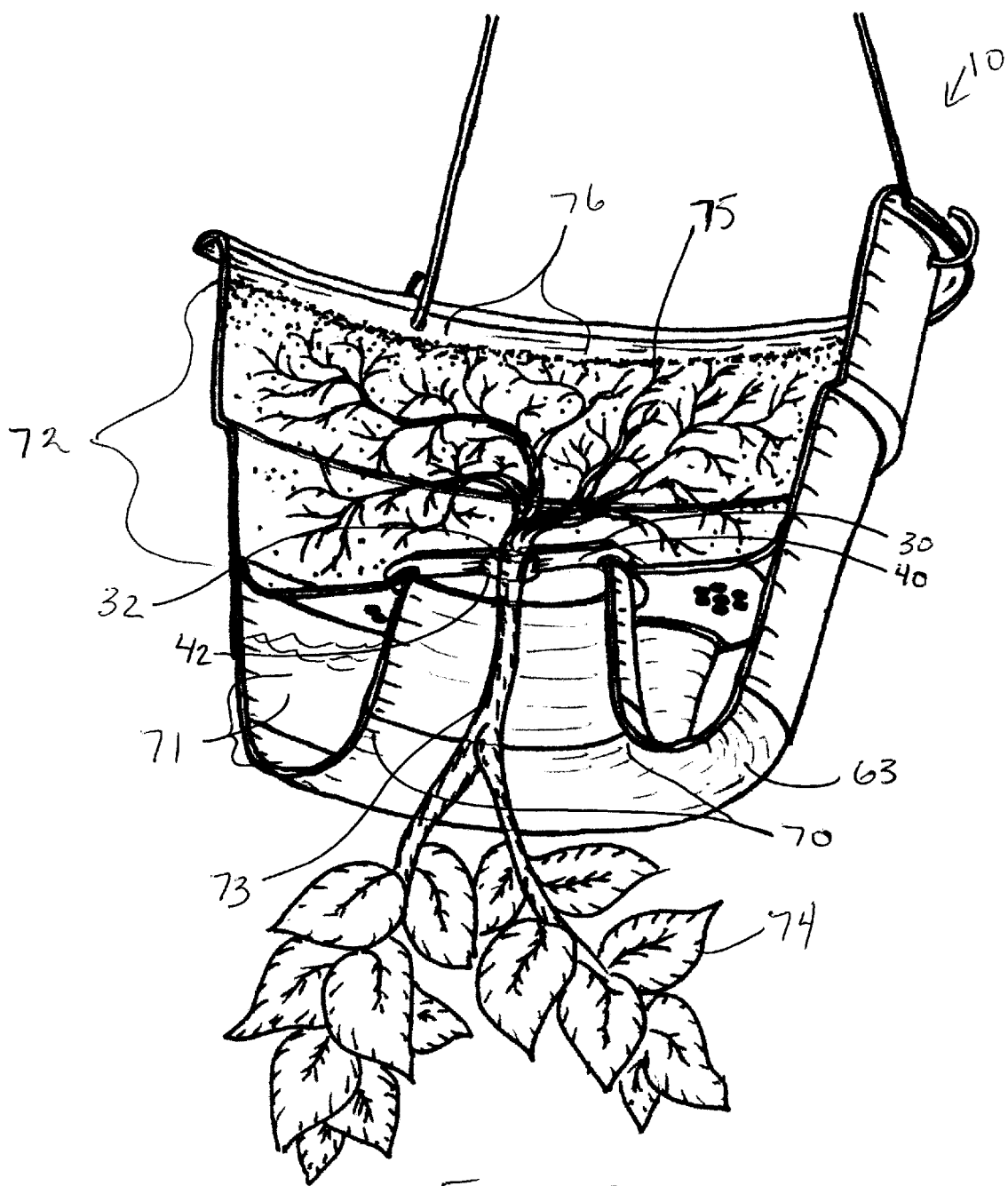
FIG. 5 is a sectional perspective view of the growing container of FIG. 1.

Referring to FIG. 5, the center perforation 32 of the upper growing medium retention device 30, when in use is aligned over the center perforation 42 of the lower growing medium retention device 40 as to allow a plants stem 73 to pass through both without being girdled while the roots 75 and growing medium 76 may not pass through the perforations 32, 42. The upper growing medium retention device 30 is positioned onto the lower growing medium retention device 40 whereas the slit 31 (FIG. 3) in the upper growing medium retention device 30 overlays a solid area of the lower growing medium retention device 40, and a solid area of the upper growing medium retention device 30 covers the slit 41 (FIG. 3) in the lower growing medium retention device 40 for better growing medium retention.

It is further contemplated that the growing medium retention devices 30, 40, may be made to be equal in design, and further contemplated that is some cases only one may be necessary. It is further contemplated that growing medium retention devices may not be necessary with plants possessing a root structure capable of retaining the growing medium within the container whereas the roots become the method of retaining soil within the container.

Referring to FIG. 3 in conjunction with FIG. 1, a drainage plate 50 separates the interior of the suspended planting container 10 into two regions, an upper growing medium region 72, and a lower reservoir region 71. The drainage plate 50 supports the bulk of the growing medium and roots above the reservoir region 71. The drainage plate 50 allows water to drain down into the reservoir region 71 through perforations 52. The perforations 52 are large enough to allow water to pass through. The perforations 52 are small enough to retain growing medium. The drainage plate 50 has a large center aperture 56 that aligns with and nests around the top edge 67 of the inner wall 66. The inner edge 57 of the center aperture 56 is an upward cured lip to allow it to nest closely with the top edge 67 of the inner wall 66. The outer edge 51 of the drainage plate 50 has an upward curved lip to nest closely with the interior of the outer wall 62 of the container.

Concave regions project downward from the drainage plate 50 and form wicking mechanisms 54. The wicking mechanisms 54 are kidney bean shaped cones that extend from the drainage plate down to the bottom of the reservoir region 71. The wicking mechanisms 54 are hollow, and open at the top 53 where they attach to the drainage plate 50. Growing medium 76 fills the wicking mechanisms 54. A small perforation 55 in the lower portion of each wicking mechanism 54 allows water from the reservoir region to directly contact the growing medium. Water passes through the growing medium in the wicking mechanism 54 by a wicking capillary action and diffuses through the bulk of the growing medium supported above the drainage plate supplying the roots with moisture.

It is further contemplated that the growing medium may be soil, or other standard hydroponics growing medium.

A port 64 in the outer wall 62 of a size able to accommodate the insertion of a watering nozzle below the level where the drainage plate 50 meets the suspended planting containers 10 outer wall 62 and above the reservoir region 71 allows for water to be added directly to the reservoir region.

Air passively circulates through the port 64, over the reservoir region 71, rising in humidity, through the perforations 52 in the drainage plate 50 up into the growing medium 76 promoting healthy root growth.

Roots 75 grow within the growing medium 76 above the upper growing medium retention device and drainage plate.

Plants may be grown with roots 75 in the growing medium 76, stems 73 and foliage 74 passing over the rim 61 as in a standard container as well as the mentioned method of growing plants out from the central vegetation region 70.

The hanging container of this invention utilizes the structures described above to enable foliage to grow from the bottom of the hanging container to provide more aesthetically pleasing foliage and stronger vine structure. Although the invention has been shown and described with respect to certain preferred embodiments, it is obvious that equivalents and modifications will occur to others skilled in the art upon the reading and understanding of the specification. For example, the outer wall, drainage plate, and inner wall may be an integral unit. Alternatively, the outer wall, base, and inner wall may be completely separate. The present invention includes all such equivalents and modifications, and is limited only by the scope of the following claims.

What is claimed is:

1. A suspended planting container comprising:
   a) a base including an outer periphery and an aperture defining a central vegetation region;
   b) an outer wall extending upward from the periphery of the base to a top edge and defining a container region;
   c) an inner wall extending upward from the base to a top edge and surrounding the central vegetation region wherein the inner wall extends to a length shorter than a length to which the outer wall extends such that the inner wall extends only partially into the container region; and
   d) a growing medium retention device including at least one perforation and coupled to the top edge of the inner wall to permit vegetation to grow through the perforation into the central vegetation region but prevent growing medium from falling from the container region into the vegetation region.

2. The suspended planting container of claim 1, further including a drainage plate positioned within the container region and separating the container region into an upper growing medium region and a lower reservoir region, the drainage plate including at least one perforation for permitting water in the upper growing medium region to drain into the lower reservoir region while generally retaining growing medium in the upper growing medium region.

3. The suspended planting container of claim 2, further including a wicking mechanism extending from the upper growing medium region to the lower reservoir region for wicking water in the lower reservoir region to the upper growing medium region.

4. The suspended planting container of claim 3, wherein the wicking mechanism includes a concave region projecting downward from the drainage plate into the lower reservoir region and includes a port through which water in the lower reservoir region may pass into the concave region and the concave region included growing medium for wicking.

5. The suspended planting container of claim 1, wherein the growing medium retention device includes a pliable first plate with an aperture and a slit extending from the aperture permitting insertion of a plant and securing of the plate around a stem of the plant.

6. The suspended planting container of claim 5, further including a second growing medium retention device including a pliable plate with an aperture and a slit extending from the aperture to permit the insertion of a plant such that the slit of the first plate and the slit of the second plate are orientated such that growing medium cannot pass through the slit of the first plate and then the slit of the second plate.

* * * * *